(12) United States Patent
Fisher, II

(10) Patent No.: US 11,023,692 B2
(45) Date of Patent: Jun. 1, 2021

(54) ENHANCED IDENTIFICATION WRISTBAND

(71) Applicant: TeleTracking Technologies, Inc., Pittsburgh, PA (US)

(72) Inventor: Stanley Manter Fisher, II, Durham, NC (US)

(73) Assignee: TeleTracking Technologies, Inc., Pittsburgh, PA (US)

( * ) Notice: Subject to any disclaimer, the term of this patent is extended or adjusted under 35 U.S.C. 154(b) by 0 days.

(21) Appl. No.: 15/697,781

(22) Filed: Sep. 7, 2017

(65) Prior Publication Data
US 2019/0073496 A1    Mar. 7, 2019

(51) Int. Cl.
| | |
|---|---|
| G06K 7/08 | (2006.01) |
| G06K 19/06 | (2006.01) |
| G06K 7/10 | (2006.01) |
| G06F 1/16 | (2006.01) |
| G06K 19/07 | (2006.01) |
| G06K 19/077 | (2006.01) |

(52) U.S. Cl.
CPC ......... *G06K 7/10336* (2013.01); *G06F 1/163* (2013.01); *G06K 19/0723* (2013.01); *G06K 19/0727* (2013.01); *G06K 19/07762* (2013.01); *G06K 19/07771* (2013.01)

(58) Field of Classification Search
USPC .................................. 235/375, 451, 492, 488
See application file for complete search history.

(56) References Cited

U.S. PATENT DOCUMENTS

| | | | | |
|---|---|---|---|---|
| 8,723,733 | B2 * | 5/2014 | Tran ....................... | H01Q 1/085 343/700 MS |
| 9,612,582 | B1 * | 4/2017 | Wang ..................... | G04G 17/04 |
| 2006/0163368 | A1 * | 7/2006 | Fogg ................. | G06K 19/07786 235/492 |
| 2008/0290176 | A1 * | 11/2008 | Fleet ................. | G06K 19/07749 235/492 |
| 2011/0226861 | A1 * | 9/2011 | Warther ............... | G06K 19/041 235/492 |
| 2012/0194976 | A1 * | 8/2012 | Golko ..................... | G06F 1/163 361/679.01 |
| 2013/0262298 | A1 * | 10/2013 | Morley ................... | H04M 1/05 705/39 |
| 2014/0266692 | A1 * | 9/2014 | Freedman ............ | G08B 21/245 340/539.11 |
| 2015/0144702 | A1 * | 5/2015 | Mei ..................... | G06K 19/0775 235/488 |
| 2016/0028153 | A1 * | 1/2016 | Li ........................ | H01Q 9/0407 343/718 |
| 2016/0259952 | A1 * | 9/2016 | Van Rens ......... | G06K 19/07766 |
| 2016/0363663 | A1 * | 12/2016 | Mindell ................ | H04W 4/029 |
| 2016/0363664 | A1 * | 12/2016 | Mindell .................. | G01S 7/352 |
| 2018/0114106 | A1 * | 4/2018 | Pheil ..................... | H04B 1/385 |

\* cited by examiner

*Primary Examiner* — Tuyen K Vo
(74) *Attorney, Agent, or Firm* — Ference & Associates LLC

(57) ABSTRACT

One embodiment provides a wristband, including: a wristband material; an padding material; and at least two antennas, wherein the at least two antennas are located between the wristband material and the padding material; wherein the at least two antennas are located having a spacing between each of the at least two antennas with respect to another of the at least two antennas; wherein the wristband material, the padding material, and the at least two antennas are formed as a wearable wristband. Other aspects are described and claimed.

20 Claims, 3 Drawing Sheets

ENHANCED IDENTIFICATION WRISTBAND

BACKGROUND

Many businesses or other entities provide wearable identification objects (e.g., wristbands, lanyards, identification cards, etc.) to employees, guests, personnel, or other people for accessing different locations of a building associated with the business or entity. For example, a business may provide a lanyard and identification card to all employees so the employees may access secure areas. Alternatively, when a guest enters the building they may be provided with an identification card that is programmed to not allow the guest to access secure areas of the building.

Other entities may provide wearable identification objects to guests so that the entity can identify the guest and the location of the guest within the building. For example, a hospital may provide an identification wristband to patients as they enter the hospital. Not only does the identification wristband allow the hospital to identify the patient, but it also allows the hospital to identify the location of the patient within the hospital. For example, a hospital employee may scan the identification wristband as the patient enters each room or location within the hospital. Some identification wristbands may be equipped with devices that are read as the patient moves about the hospital. For example, the wristband may include a radio frequency identification (RFID) transmitter that can be read by receivers located throughout the hospital. When the transmitter responds to the reader, the transmitter provides a unique identification number which identifies that particular transmitter, and accordingly uniquely identifies the particular identification object corresponding to that transmitter.

BRIEF SUMMARY

In summary, one aspect provides a system, comprising: a wearable material, wherein the wearable material is formed as a wearable object; and at least two antennas operatively coupled to the wearable material; wherein the at least two antennas are located having a spacing between each of the at least two antennas with respect to another of the at least two antennas.

Another aspect provides a wristband, comprising: a wristband material; an padding material; and at least two antennas, wherein the at least two antennas are located between the wristband material and the padding material; wherein the at least two antennas are located having a spacing between each of the at least two antennas with respect to another of the at least two antennas; wherein the wristband material, the padding material, and the at least two antennas are formed as a wearable wristband.

A further aspect provides an identification system, comprising: a wristband comprising: a wristband material; an padding material; and at least two radio frequency identification antennas, wherein the at least two radio frequency identification antennas are located between the wristband material and the padding material; wherein the at least two radio frequency identification antennas are located having a spacing between each of the at least two radio frequency identification antennas with respect to another of the at least two radio frequency identification antennas; wherein the wristband material, the padding material, and the at least two radio frequency identification antennas are formed as a wearable wristband; a plurality of radio frequency identification receivers, wherein each radio frequency identification receiver communicates with at least one of the at least two radio frequency identification antennas when the wristband is within a predetermined distance of the radio frequency identification receiver and wherein each radio frequency identification receiver is located at a known location within a building; wherein the wristband and the plurality of radio frequency identification receivers communicate to determine the location of the wristband within the building based upon the radio frequency identification receiver communicating with the wristband.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
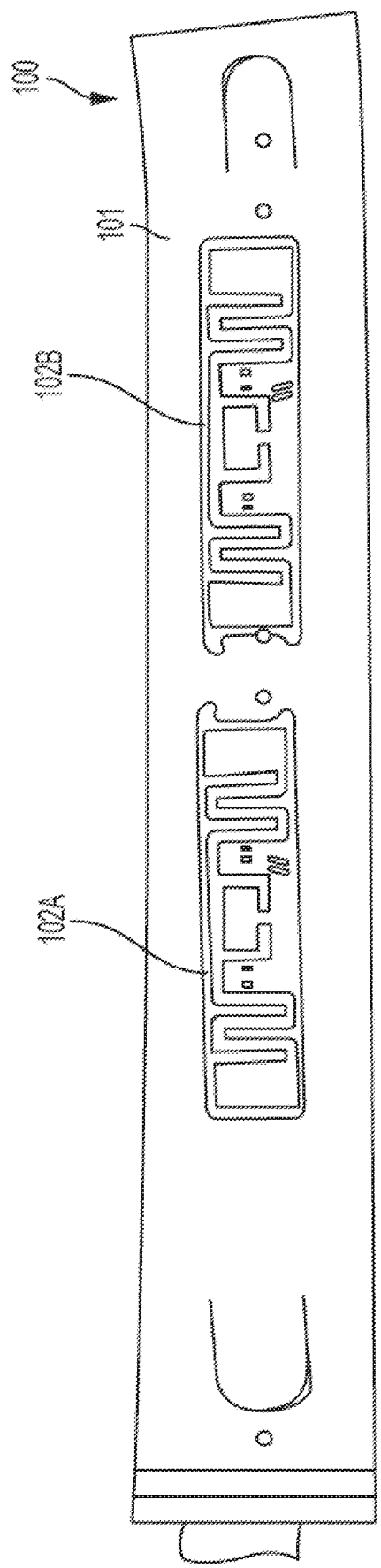
FIG. 1 illustrates an example wristband with two antennas.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many hospitals or other businesses may provide wearable identification objects (e.g., lanyards, wristbands, identification cards to be worn by a user, etc.) to each person that enters a building, facility, or other area associated with the hospital or business. These wearable identification objects may provide access to particular areas within the facility. Additionally, these wearable identification objects may allow the business to identify the person wearing the object and, in some cases, may allow the business to track the location of the person within the facility. For example, many hospital identification wristbands include device circuitry that allows the wristband to communicate with receivers located throughout the facility. As a person or patient travels throughout the hospital or facility, the wristband communicates with these receivers. Based upon which receiver has communicated with the wristband, hospital personnel can be apprised of where the person is within the hospital. Specifically, the transmitters on the wristband will response to the receiver with a unique identification number which is assigned to each wristband. Thus, upon receipt of the unique identification number the number can be used to identify the wristband and the patient assigned to that wristband.

Hospitals can use this information to determine when a patient has left the hospital or when hospital personnel should be scheduled to perform various procedures. For example, if the receiver that reads the wristband is a receiver located at the exit of the hospital, systems within the hospital can be updated to designate that the patient has been discharged and is no longer at the hospital. The hospital can then prepare the room previously occupied by that patient for a new patient. As another example, if the receiver that reads the wristband is a receiver located at a door frame of an x-ray room, the hospital system can be updated so that the patient is not scheduled for another procedure at the same time that the patient is getting an x-ray taken. With the use of the identification wristbands, these systems may be updated automatically without needing hospital personnel to update the status of the patient. Additionally, any personnel that need to be notified of the change can be notified automatically. Such a system provides a quicker transition between patients. Additionally, such a system reduces the chances of a patient from being scheduled for multiple procedures at the same time, thereby providing for a more efficient scheduling of both the patient and hospital personnel.

The readable wristbands generally include a transmitter in the form of an antenna that can be read by the receiver or reader. When the transmitter is within a predetermined distance of the receiver, the receiver sends a signal to the transmitter and the transmitter transmits a return signal including the identification information associated with the particular wristband. Generally the transmitter and receiver are in the form of radio frequency identification (RFID) technology. RFID technology works well when the transmitter and receiver have a direct line of sight. In other words, the technology works well as long as there are no objects between the transmitter and receiver. Accordingly, receivers may be placed at multiple locations within a defined area. For example, if the desired reading location is a door frame, multiple receivers may be placed at or on the door frame, for example, one receiver on the left side of the door frame and one receiver on the right side of the door frame. This allows at least one of the receivers to detect the transmitter regardless of whether the transmitter is located on the left or right wrist of the user.

However, a problem arises with this system if the distance between the receivers is too great, for example, in the case of a wide door frame. Specifically, because the range of an RFID receiver/transmitter may be only a few feet or meters. Therefore, if the distance between the receivers is too great, a "blind spot" may occur. This blind spot may be a location within the door frame that none of the receivers can communicate with a transmitter. For example, if one receiver is located on the left side of a wide door frame and another receiver is located on the right side of the door frame, a blind spot may occur directly in the center of the door frame where no communications will occur between either of the receivers and a transmitter located in this blind spot. Specifically, because the antenna of the wristband is passive and only activated when a signal is received from a receiver, if the antenna is outside the range of the receiver no signals will be transmitted between the receiver and transmitter.

An additional problem with this system arises when the transmitter is no longer located at the top of the patients wrist, for example, the wristband has rotated such that the transmitter is now located at the bottom of the patient's wrist. As stated above, because RFID signals work best when the transmitter and receiver are located in a direct line of sight configuration, when the patient's wrist is located between the receiver and transmitter readability of the transmitter may be reduced. More specifically, the readability of the transmitter may be reduced to such a level that it may not be read at all. Accordingly, the patient tracking system may not be updated and the location of the patient may remain unknown.

The current solution is to lengthen the antenna to cover the majority of the wristband. The problem with this solution is that overlap of the antenna can cause the antenna to detune, degrade, or cause interference. Unfortunately, this is a common situation, for example, in the case that a patient has a small wrist. If the antenna is designed for an average wrist size, for example, such that it covers 80% of the wristband, when a patient having a small wrist wears the wristband there will be overlap of the antenna, which can cause detuning or interference, which may cause the wristband to be unreadable by the readers.

Accordingly, an embodiment provides an enhanced wristband identification system. The system as described herein uses a multiple antenna design that increases the readability of the wristband. The term wristband will be used herein throughout to increase readability. However, it should be understood by one skilled in the art that other wearable identification objects can be used, for example, lanyards, identification cards, and the like. The antennas and locations of the antennas within the wristband are designed to reduce interference between the multiple antennas but still provide antennas that are located in such a manner that at least one of the antennas can be read by a reader no matter how the wristband is located on the user's wrist. Additionally, because there is more than one antenna within the wristband, each antenna would be assigned to the same unique identification number assigned or corresponding to the wristband. Therefore, regardless of which antenna of the wristband responds to the receiver, the receiver receives the same unique identification number which is assigned to the particular wristband.

The illustrated example embodiments will be best understood by reference to the figures. The following description is intended only by way of example, and simply illustrates certain example embodiments.

FIG. 1 illustrates an example wristband embodiment. The wristband 100 includes a wristband material 101, for example, paper, cloth, plastic, or other material. The wristband also includes a plurality of antennas 102A and 102B. For ease of understanding, only two antennas are shown. However, it should be understood that more than two antennas may be used and more than two antennas may be preferred in certain applications. The antennas 102A and 102B may be located on top of the wristband material 101. The antennas may be coupled to the wristband material to prevent the antennas from moving within the wristband. For example, the antennas may be glued, taped, or otherwise adhered to the wristband material. Alternatively, the wristband may be designed such that the antennas cannot move but they are not adhered to the wristband material. For example, the wristband material may include one or more pockets for the antennas. As another example, the antennas may be integral to the wristband material.

Due to the fact that each wristband contains more than one antenna, each antenna of the wristband may be assigned the same unique identification number that corresponds to the wristband. In other words, each antenna within the wristband would respond with the same identification number. Accordingly, regardless of which antenna is read by or provides a signal to a receiver, the same unique identification number will be provided to the receiver. In other words, each antenna would respond to an interrogation with the same unique identification number. This unique identification number is assigned to or corresponds to the particular wristband and can be used to look up the wristband and corresponding patient wearing the wristband.

The antennas may be a folded antenna design, as shown in FIG. 1, that allows the antennas to be shorter than a typical RFID antenna. The antenna may also be a coiled antenna design. In such designs the antenna is folded or coiled in order to shorten the overall length of the antenna. The antenna may be a dipole antenna design having nodes on both sides of the antenna. As with typical RFID antennas, the antennas may radiate in the 900-928 mHz frequency band. The antennas may be spaced on the wristband material or within the wristband so that the antennas do not touch or overlap, for example, when the wristband is on a user's wrist. However, using the folded or coiled antenna design, the antennas are less likely to detune each other when in contact. Accordingly, some overlap of the antennas is acceptable.

The antennas may also be spaced so that on an average wrist one antenna is located on the top of the wrist and one antenna is located on the bottom of the wrist. This allows a reader to communicate with the wristband no matter how the wristband is located or oriented on a user's wrist. As discussed above, more than two antennas may be used. Accordingly, the spacing between each of the antennas may be designed such that the antennas are located in locations on a user's wrist for the highest readability. The antennas may also be spaced so that each antenna does not touch another antenna.

Figure 2:
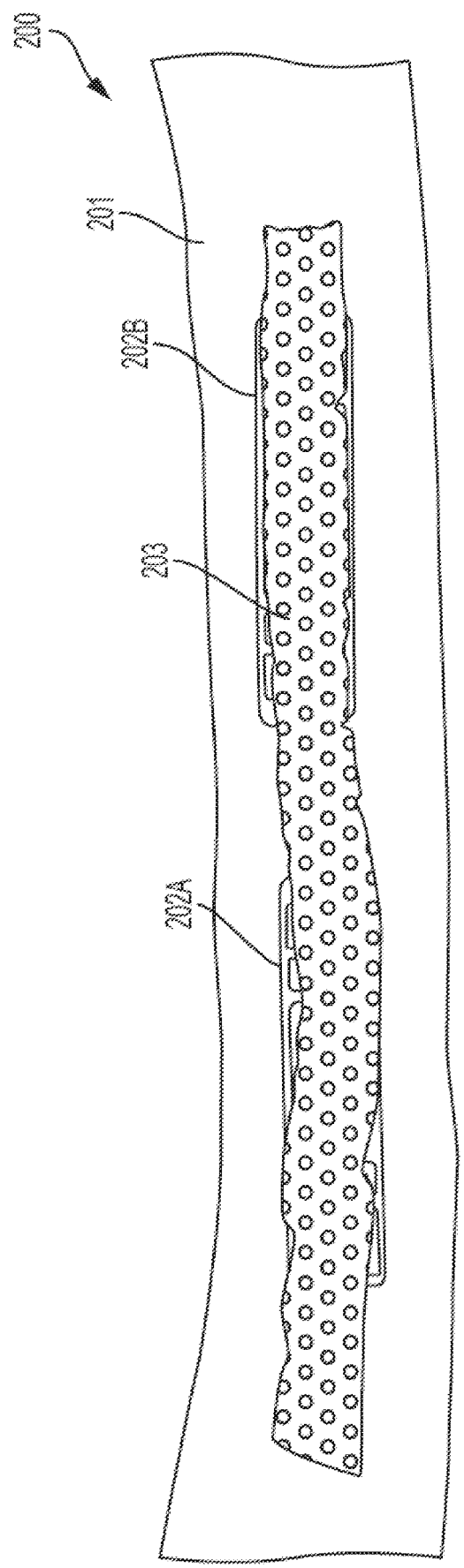
FIG. 2 illustrates another example wristband with two antennas and insulating material.

Antennas may detune when in the presence of a person. For example, if a person holds the antenna, the antenna may be detuned. If the antenna is detuned then it will be unable to communicate with the receivers or readers. Accordingly, as shown in FIG. 2, the wristband 200 may also include a padding material 203 located on top of the antennas 202A and 202B, which are located on top of the wristband material 201. This padding material 203 may be used to prevent the antennas from detuning the presence of a user. The padding material may be of a thickness that is designed to provide enough distance between the antenna and the user. For example, the thickness may be 2-5 mm thick. The padding material may be of a material that provides an insulating barrier between the antenna and the user. In other words, the padding material may be a material that is non-conductive. The padding material may also be a soft, flexible material so that the wristband can be formed around a user wrist and is not uncomfortable. Accordingly, padding materials may include plastic, cloth, flexible fibers, and the like.

The wristband 100 and 200 illustrated in FIGS. 1 and 2 are shown in an open configuration. In other words, the figures illustrate the wristband without a backing material. In practice, the inside of the wristband, including the antennas 102A, 102B, 202A, and 202B and/or padding material 203 would not typically be seen. The wristband 100 or 200 may include additional layers or materials. For example, the wristband may include a backing material or backing layer that is placed over the top of the antennas and/or padding material. Alternatively, the wristband material 101 or 201 may be intended to be folded over to create the back of the wristband.

The wristband may communicate with a radio frequency identification reader or receiver located within the building. A single building or facility may have more than reader in more than one location within the facility. Each of these readers may have a known or fixed location within the facility. Accordingly, when the wristband transmitter communicates with a reader within the facility, the system may identify the location of the wristband and the user wearing the wristband. In other words, because the transmitter and receivers can only communicate when within a predetermined distance of each other, when the wristband and one of the plurality of radio frequency identification receivers communicate, the location of the wristband can be determined based upon the known location of the reader.

Thus, a patient may be outfitted with an active or passive identification tag as part of a Real-Time Location System (RTLS) used to automatically track and identify the location of the patient within the hospital. The RTLS system may cover the entire hospital, a portion of the hospital (i.e., nursing areas, surgical suites, etc.), or the discharge areas of the hospital, depending on the preferences of the hospital administration. Any suitable RTLS technology may be used, including radio frequency, optical (i.e., infrared), and acoustic (i.e., ultrasound). Dual mode and single mode systems may also be used. (An example of a dual mode system is an identification tag that receives a signal from an infrared beacon and broadcasts an RF signal. The RF signal includes an identifier associated with the beacon from which the infrared signal was received together with an identifier associated with the tag itself) A patient's identification tag may be a radio frequency identification (RFID) tag, an infrared identification tag, or a sound identification tag, or any suitable identification tag. Such tags may be placed within a standard badge, worn with standard hospital ID bands, or located in any suitable place.

Thus, as the patient moves through the hospital the wristband communicates with strategically placed readers. The patient's location and status can then be updated in the RTLS so that the room status' can be updated, patient status can be updated, hospital staff can be appropriately scheduled, and the like. Using the wristband with a plurality of antennas as described herein, and where each of the antennas of the wristband respond to an interrogation with the same identification number unique to the wristband, so that regardless of which antenna is successful read by a reader or receiver the resulting unique identification number would be the unique identification number of the wristband, the system is more accurate in that the chance of the wristband not being read by a reader is reduced or eliminated altogether.

The various embodiments described herein thus represent a technical improvement to current identification system. Using the system and techniques as described herein provide a system which results in increased readability of wearable identification objects. Rather than requiring a longer antenna, the system as described herein uses multiple antennas and is designed in such a fashion such that the antennas do not overlap or interfere with each other. Additionally, the design of the antennas provides that the antennas do not interfere with each other and that each of the antennas of the wristband respond to interrogation with the identical (unique) identification number, so that regardless of which of the antennas was successfully read by a reader or receiver the resulting unique ID number would be the unique ID number of the wristband. Accordingly, using the system and techniques as described herein, more accurate and reliable readings of the identification object can be achieved.

While various other circuits, circuitry or components may be utilized in information handling devices, with a computer, server, client device or the like, an example device that may be used in implementing one or more embodiments includes a computing device in the form of a computer 300. This example device may be a server used in one of the systems in a hospital network, or one of the remote computers connected to the hospital network. Components of computer 300 may include, but are not limited to, a processing unit 320, a system memory 330, and a system bus 322 that couples various system components including the system memory 330 to the processing unit 320. Computer 300 may include or have access to a variety of computer readable media, including databases. The system memory 330 may include non-signal computer readable storage media, for example in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 300 through input devices 350. A monitor or other type of device can also be connected to the system bus 322 via an interface, such as an output interface 360. The computer may include a database 340, e.g., if it is part of the warehouse layer in FIG. 1. In addition to a monitor, computers may also include other peripheral output devices. The computer 300 may operate in a networked or distributed environment using logical connections to one or more other remote device(s) 380 such as other computers. The logical connections may include network interface(s) 370 to a network, such as a local area network (LAN), a wide area network (WAN), and/or a global computer network, but may also include other networks/buses.

Figure 3:
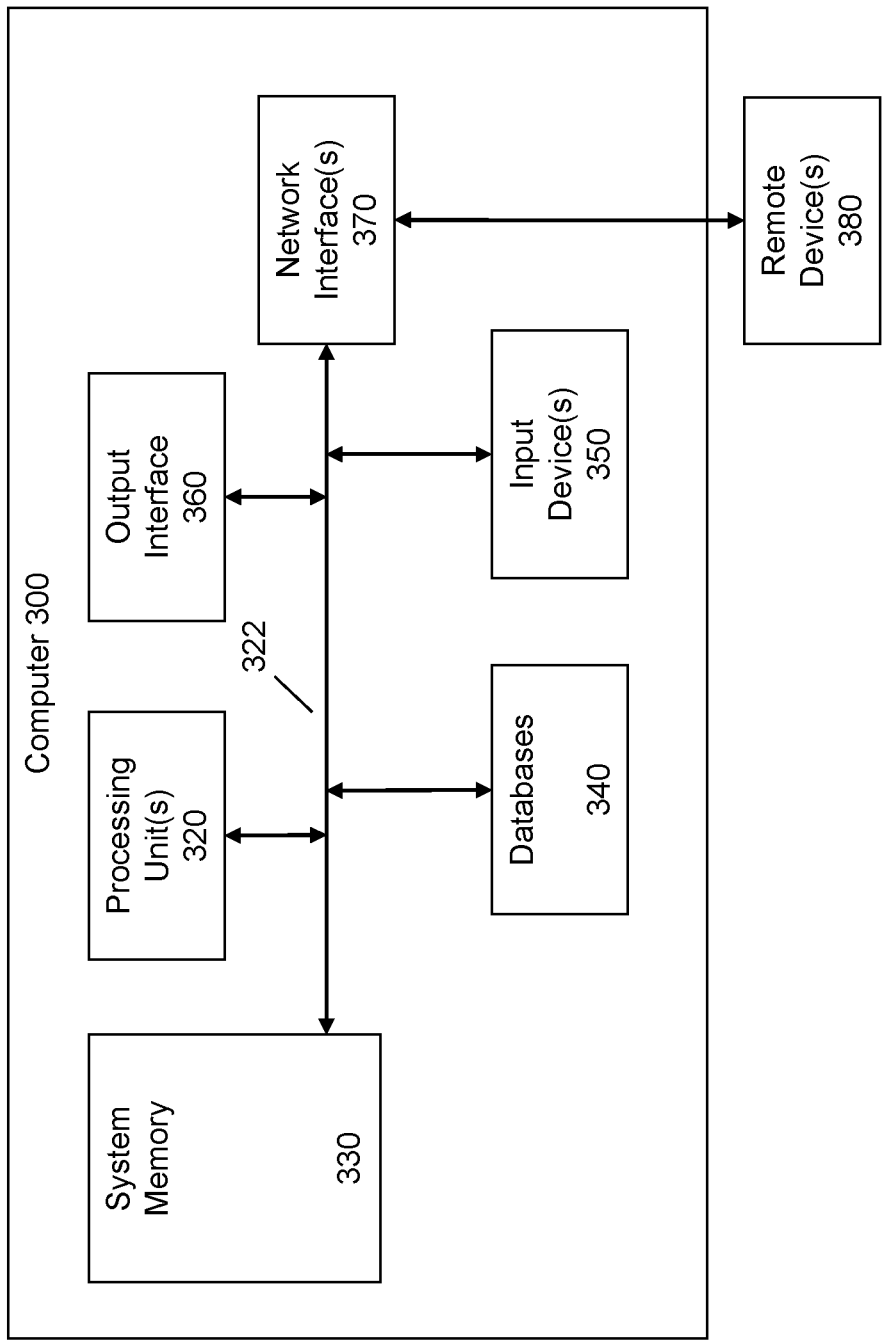
FIG. 3 illustrates an example of device circuitry.

Information handling device circuitry, as for example outlined in FIG. 3, may be used in client devices such as a personal desktop computer, a laptop computer, or smaller devices such as a tablet or a smart phone. In the latter cases, i.e., for a tablet computer and a smart phone, the circuitry outlined in FIG. 3 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 3 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying

What is claimed is:

1. A system, comprising:
a wearable object comprising a flexible wearable material; and
at least two antennas operatively coupled to the flexible wearable material and located within the flexible wearable material of the wearable object, wherein the at least two antennas are provided as components within a single identification tag of the wearable object and wherein each of the at least two antennas are assigned the same identification number corresponding to the wearable object and any of the at least two antennas provide identification information based upon the identification number to a receiver when receiving a signal from the receiver, wherein the at least two antennas are tuned within the same frequency band;
wherein the at least two antennas are located in an end-to-end configuration within a same layer of the wearable object and having a lateral spacing between the ends of each of the at least two antennas with respect to another of the at least two antennas, wherein the at least two antennas are laterally spaced within the same layer of the wearable object such that, when the wearable object is being worn, at least one of the at least two antennas is located at a first point and at least another of the at least two antennas is located at a second point substantially opposite the first point.

2. The system of claim 1, wherein the at least two antennas comprise dipole antennas.

3. The system of claim 1, wherein the spacing between each of the at least two antennas with respect to another of the at least two antennas comprises a spacing such that adjacent antennas do not touch.

4. The system of claim 1, wherein the at least two antennas comprise a folded antenna design.

5. The system of claim 1, wherein the at least two antennas comprise radio frequency identification antennas.

6. The system of claim 5, wherein the at least two antennas communicate with a radio frequency identification reader.

7. The system of claim 6, wherein the radio frequency identification reader has a fixed location within a building.

8. The system of claim 7, wherein a location of the at least two antennas is identified based upon communication between at least one of the at least two antennas and a radio frequency identification reader.

9. A wristband, comprising:
a flexible wristband material;
a padding material, wherein the padding material provides distance between at least two antennas and a user when wearing the wristband and wherein the padding material comprises a non-conductive material; and
the at least two antennas, wherein the at least two antennas are located between the flexible wristband material and the padding material of the wristband, wherein the at least two antennas are provided as components within a single identification tag of the wristband and wherein each of the at least two antennas are assigned the same identification number corresponding to the wristband and any of the at least two antennas provide identification information based upon the identification number to a receiver when receiving a signal from the receiver, wherein the at least two antennas are tuned within the same frequency band;
wherein the at least two antennas are located in an end-to-end configuration within a same layer of the wristband and having a lateral spacing between the ends of each of the at least two antennas with respect to another of the at least two antennas, wherein the at least two antennas are laterally spaced within the same layer of the wearable object such that, when the wristband is worn by a user, at least one of the at least two antennas is located at a first point of a wrist of the user and at least another of the at least two antennas is located at a second point substantially opposite the first point of the wrist of the user;
wherein the flexible wristband material, the padding material, and the at least two antennas are formed as a wearable wristband.

10. The wristband of claim 9, wherein the at least two antennas comprise dipole antennas.

11. The wristband of claim 9, wherein the padding material is of a thickness as to prevent detuning of the at least two antennas when in contact with a user.

12. The wristband of claim 9, wherein the spacing between each of the at least two antennas with respect to another of the at least two antennas comprises a spacing such that at least one of the at least two antennas is located at the top of a wrist of a user and at least one other of the at least two antennas is located at the bottom of the wrist of the user when the wearable wristband is worn by the user.

13. The wristband of claim 9, wherein the spacing between each of the at least two antennas with respect to another of the at least two antennas comprises a spacing such that adjacent antennas do not touch.

14. The wristband of claim 9, wherein the at least two antennas comprise a folded antenna design.

15. The wristband of claim 9, wherein the at least two antennas comprise radio frequency identification antennas.

16. The wristband of claim 15, wherein the at least two antennas communicate with a radio frequency identification reader.

17. The wristband of claim 16, wherein the radio frequency identification reader has a fixed location within a building.

18. The wristband of claim 17, wherein a location of the at least two antennas is identified based upon communication between at least one of the at least two antennas and a radio frequency identification reader.

19. The wristband of claim 9, wherein the wearable wristband comprises a hospital identification wristband.

20. An identification system, comprising:
a wristband comprising:
a wristband material;
a padding material, wherein the padding material provides distance between at least two radio frequency identification antennas and a user when wearing the wristband and wherein the padding material comprises a non-conductive material; and
the at least two radio frequency identification antennas, wherein the at least two radio frequency identification antennas are located between the wristband material and the padding material within the wristband, wherein the at least two radio frequency antennas are provided as components within a single identification tag of the wristband and wherein each of the at least two radio frequency antennas are assigned the same identification number corresponding to the wristband, wherein the at least two radio frequency antennas are tuned within the same frequency band;

wherein the at least two radio frequency identification antennas are located in an end-to-end configuration within a same layer of the wristband material and having a lateral spacing between the ends of each of the at least two radio frequency identification antennas with respect to another of the at least two radio frequency identification antennas, wherein the at least two antennas are laterally spaced within the same layer of the wristband material such that, when the wristband is worn by a user, at least one of the at least two antennas is located at a first point of a wrist of the user and at least another of the at least two antennas is located at a second point substantially opposite the first point of the wrist of the user;

wherein the wristband material, the padding material, and the at least two radio frequency identification antennas are formed as a wearable wristband;

a plurality of radio frequency identification receivers, wherein each radio frequency identification receiver communicates with any of the at least two radio frequency identification antennas to receive identification information based upon the identification number from any of the at least two radio frequency identification antennas when the wristband is within a predetermined distance of the radio frequency identification receiver and wherein each radio frequency identification receiver is located at a known location within a building;

wherein the wristband and the plurality of radio frequency identification receivers communicate to determine the location of the wristband within the building based upon the radio frequency identification receiver communicating with the wristband.

* * * * *